Nov. 14, 1961   W. J. HANSON ET AL   3,008,576
DOCUMENT FEEDING, SORTING AND STACKING DEVICE
Filed Dec. 26, 1957   6 Sheets-Sheet 5
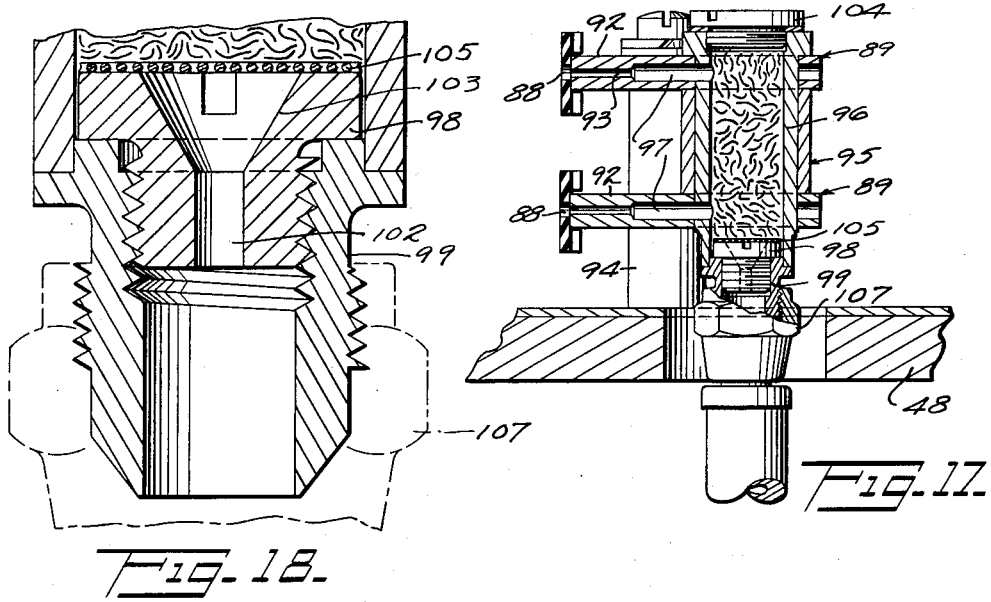
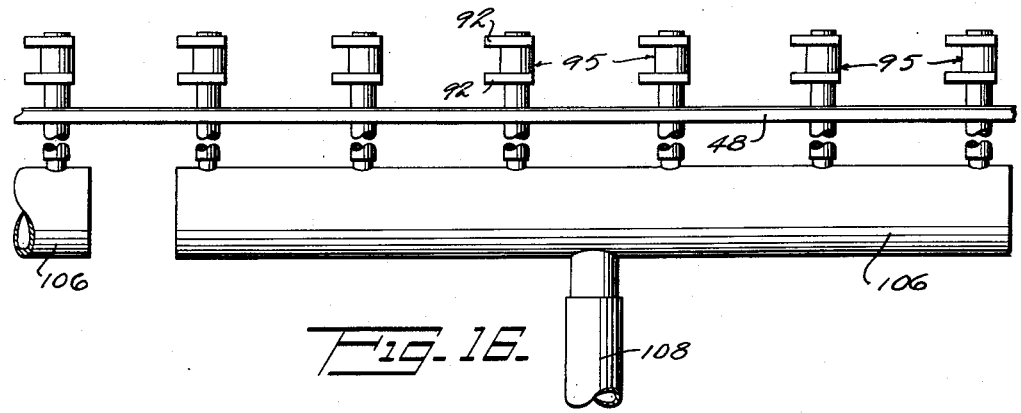
INVENTORS
Walter J. Hanson
BY Robert E. Schmeck
ATTORNEY

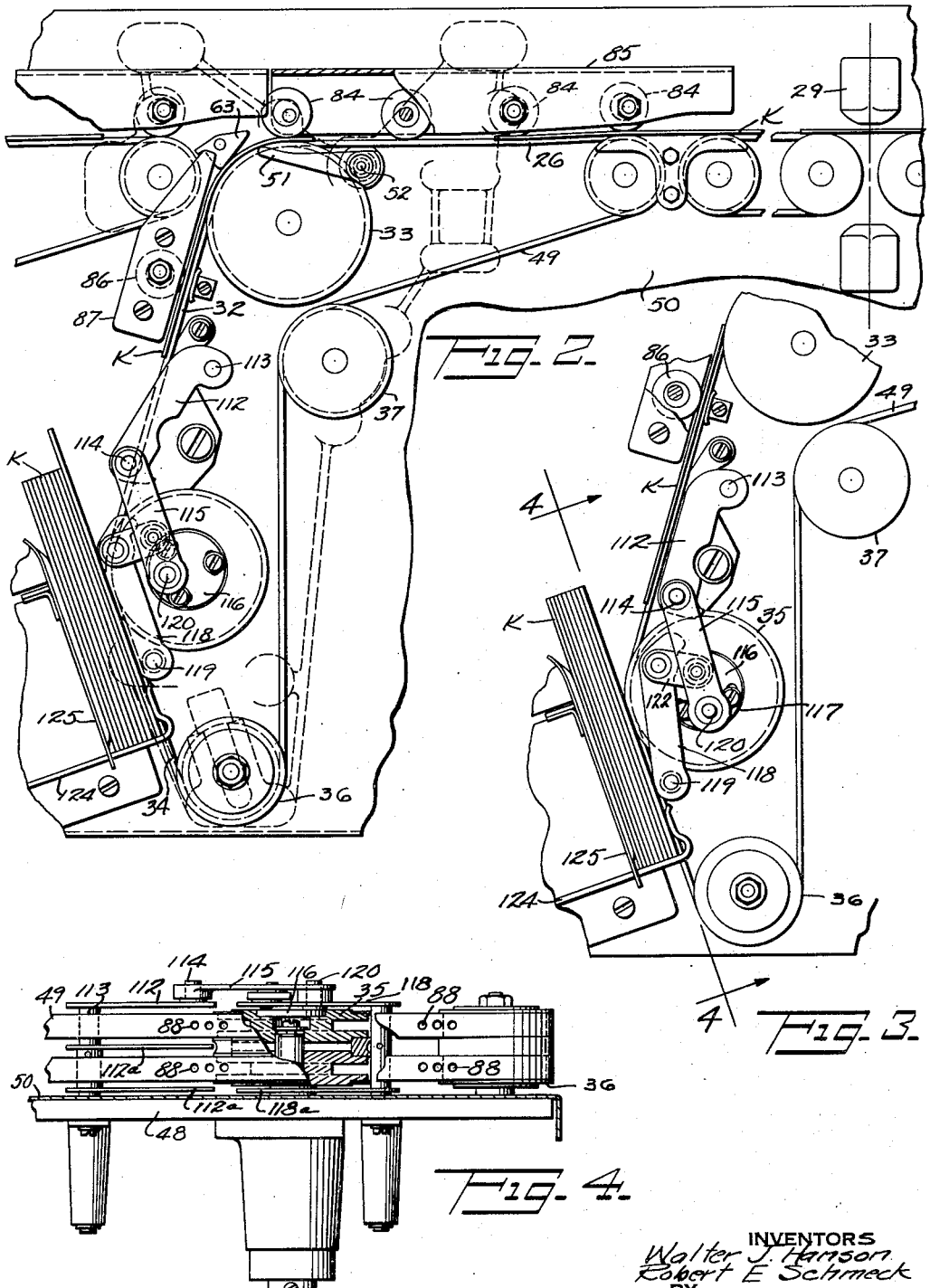

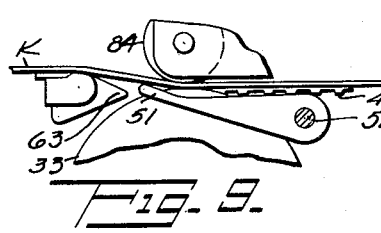
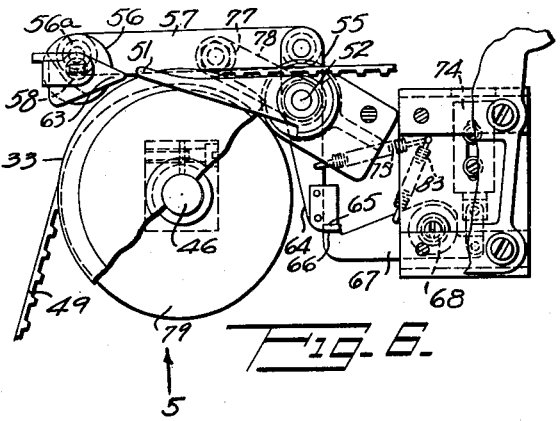
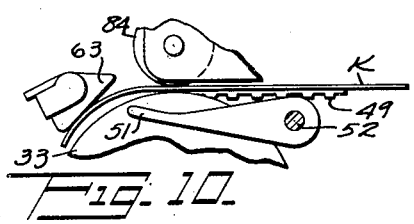
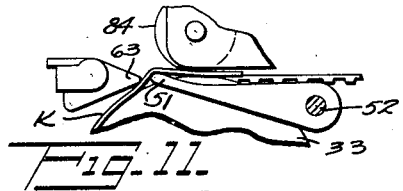
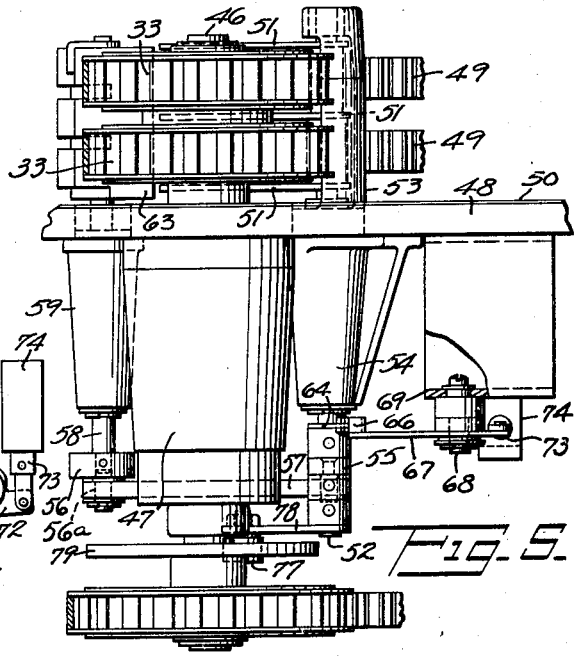
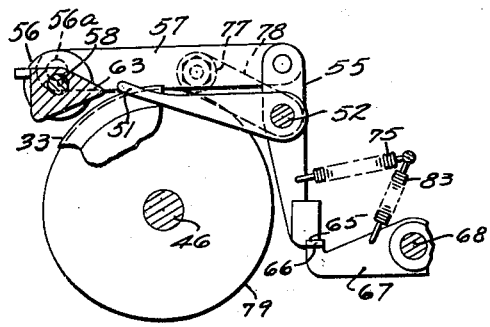

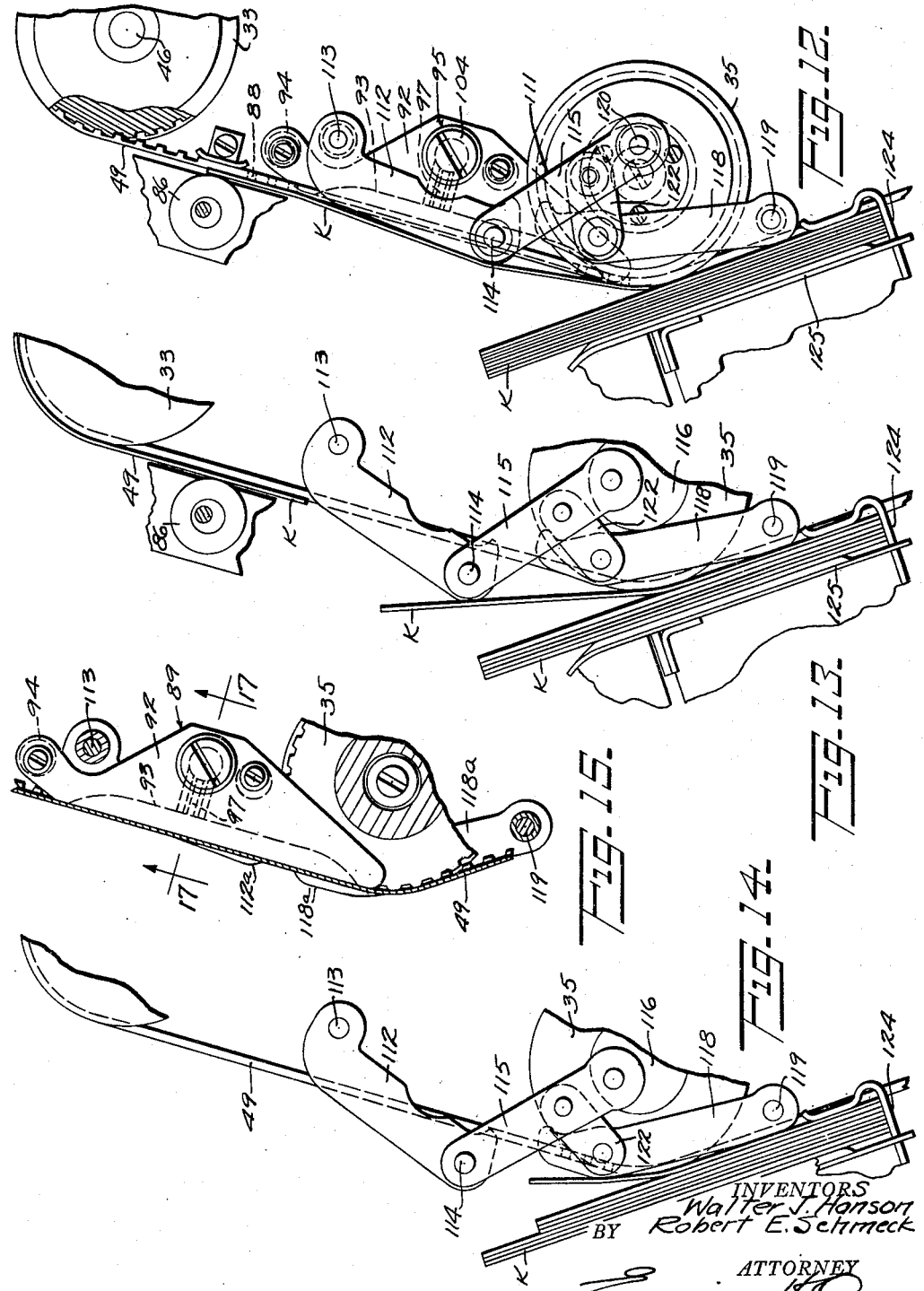

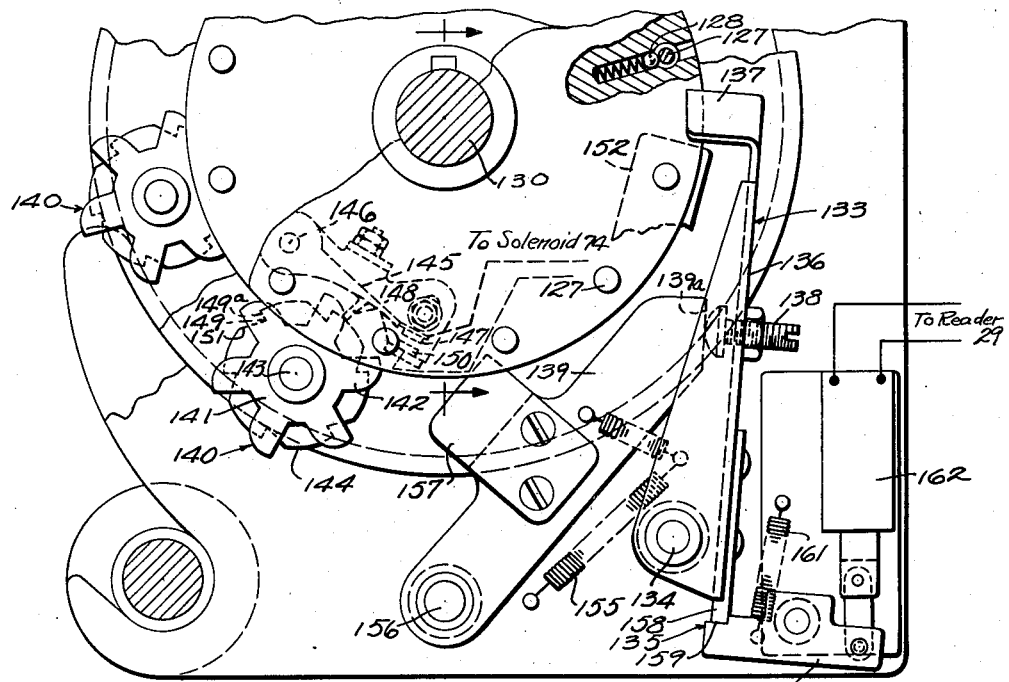
Fig. 19.
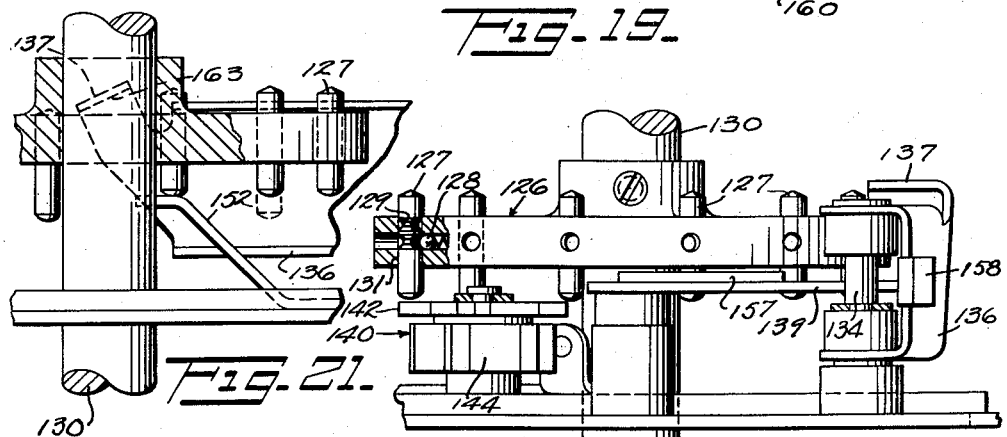
Fig. 21.
Fig. 20.
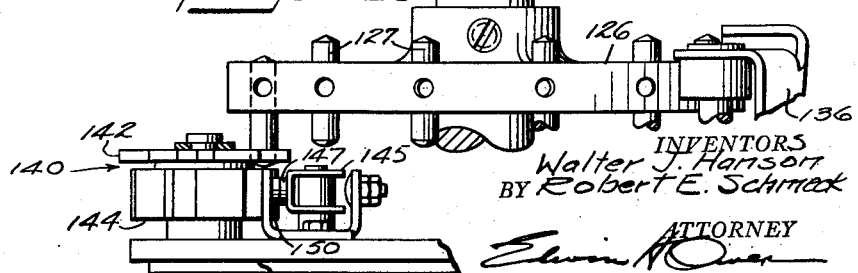
INVENTORS
Walter J. Hanson
BY Robert E. Schmak
ATTORNEY

United States Patent Office 3,008,576
Patented Nov. 14, 1961

3,008,576
DOCUMENT FEEDING, SORTING AND
STACKING DEVICE
Walter J. Hanson, Old Greenwich, and Robert E.
Schmeck, Riverside, Conn., assignors to Pitney-Bowes,
Inc., Stamford, Conn., a corporation of Delaware
Filed Dec. 26, 1957, Ser. No. 705,296
4 Claims. (Cl. 209—74)

This invention relates to the stacking mechanism of a document feeding, sorting and stacking device of the type disclosed in patent application Serial No. 602,191, filed August 6, 1956, now Patent No. 2,977,114.

In said device, documents, which will be hereinafter referred to as checks, are advanced at high speed on their long lower edges past an electronic reading head where certain data is read and the checks are sorted and stacked at the same high speed at one of a number of stacking stations in accordance with account numbers, serial numbers or any desired order designated by data provided in a reading position on the check. With checks moving at high speeds of 800 or more per minute, many problems were involved in directing the checks in an orderly manner to their stacking stations.

After passing the reading position the checks in the machine of this invention follow a substantially straight course as directed by one reach of a plurality of traveling belt surfaces each forming a part of a closed loop and spaced end to end for the purpose of allowing for the gating of checks to selected stacking positions. A continuing portion of the belt forming each loop provides a second reach directed away from the straight course which is followed by the checks when gated thereto. Vacuum means is also associated with the second reach of the belt to exert negative pressure through holes in the belt when covered by a check to cause the check to be advanced thereby when approaching its final stacking position. Also associated with the latter is means for urging the trailing end of the check away from the surface of the belt during the final movement of the check to its stacking position, thereby clearing the way for the leading edge of a second check if two checks should be directed in sequence to the same stacker station.

Upon reading the data on a check, an electrical signal is transmitted to a memory device which retains the signal until the check approaches the stacking station represented by the belt loop which is to receive it. The signal from the memory device is released when the check approaches a gating position, causing selected gating mechanism to function.

When the check is gated, it is directed from its straight course in a direction away from said course along the second reach of belt. The direction of the check is again changed, as by means of the third reach of the belt loop, before arriving at its final stacking position.

The vacuum system provided cooperates with spaced groups of holes in the belts as they pass along the second reach thereof and effects a negative pressure or suction when the check covers any group of holes while within the vacuum range. The groups of holes are arranged and the checks are timed so that the leading end of the check is in engagement with the holes to thereby effectively pull the checks while within the vacuum range.

Associated with the vacuum system, as used with the stacker stations, is an arrangement whereby zero negative pressure is maintained at an orifice through which the vacuum is directed to a chamber in back of the holed portions of the belt. Upon engagement of a check with any holed area, the vacuum or negative pressure is increased sufficiently to cause the check to be drawn to the belt and be advanced thereby.

In arriving at the above arrangement, a pump supplies a continuous negative pressure to a manifold from which several outlets are directed to several vacuum areas associated with the stacking stations, one outlet for each station. Each outlet is provided with a vacuum metering valve which includes an orifice calculated to provide zero pressure when there is no check present at the vacuum area and a negative pressure of about —7 to —15 inches of mercury when the holes in the belt are blocked off by the presence of a check at the vacuum area. As a result of the provision of a metering valve for each outlet, a constant zero pressure is maintained when there are no checks present at the vacuum area.

The belt contains holes in groups at equal distances between the first hole of one group and the first hole of the next group, and said groups of holes are arranged in relation to the vacuum area so that only one group of holes will be within said vacuum area at any one time.

It is the principal object of the invention to provide for the stacking of checks and like sheet documents which are fed on edge by a series of closed loop traveling belts wherein the belts are arranged to normally frictionally advance the checks in a substantially straight path, the belt loops being spaced apart at stacking positions to allow deflection of checks at selected spaced locations under control of reading and memory means.

Other objects are to provide improved devices for the control of the check during the advance thereof to a stacking position, in effecting deflection from the first reach of any loop of a belt to the second reach thereof; in the vacuum control of the check while advancing along the second reach of the belt loop; and in the provision of means to force the trailing end of the check away from the belt surface when approaching its final stacking position, to thereby avoid interference with a following check when two checks follow in sequence to the same stacking position.

A preferred embodiment of the invention is illustrated in the drawings, wherein:

FIG. 2 is a plan view showing one unit of the loop belt structure with means for deflecting a check from one reach of the belt to a stacking position;

FIG. 3 is a fragmentary view similar to FIG. 2 but showing some of the parts in a different position;

FIG. 4 is an elevational view with parts broken away, taken in the direction of the arrows 4—4 on FIG. 3;

FIG. 5 is a front elevational view looking in the direction of the arrow 5 on FIG. 6 showing a pulley mounting and parts associated with the gating or deflecting mechanism;

FIG. 6 is a plan view of FIG. 5 showing the check deflecting mechanism with means for the control of said mechanism;

FIG. 7 is a fragmentary plan view of FIG. 6 showing the control mechanism in an actuating position with the deflecting mechanism in a check deflecting position;

FIG. 8 is a view similar to FIG. 7 showing a cam control means restoring the control mechanism and deflecting mechanism to its non-deflecting position, also showing the check deflecting element in section;

FIGS. 9, 10 and 11 show fragmentary views of the deflecting mechanism with a check passing over the deflecting mechanism in FIG. 9; with the deflecting mechanism in a check deflecting position as in FIG. 10; and with the deflecting mechanism restored before the check has completed its movement therepast as in FIG. 11;

FIG. 12 is a plan view of the stacker portion of the loop belt structure showing a check advancing along a second reach of the belt structure and approaching a stacking position along a third reach of said belt structure;

FIG. 13 is a fragmentary view similar to FIG. 12, showing mechanism for forcing the trailing end of the check away from the belt surface for the purpose of permitting the leading end of a second check to move toward a stacking station without obstruction;

FIG. 14 is a view similar to FIG. 13 with the parts in a position showing a similar operation to that of FIG. 13 but with mechanism for forcing the trailing end of a short check away from the belt surface;

FIG. 15 is a fragmentary view showing the location of vacuum control check feed means including a vacuum chamber along the second reach of the loop belt structure;

FIG. 16 is a partial diagrammatic view showing an arrangement for supplying negative pressure to the vacuum chambered elements shown in FIG. 15 by means of a header having a plurality of valve controlled units connected thereto;

FIG. 17 is a vertical section taken on the line 17—17 of FIG. 15 through the vacuum chambered elements and valve elements associated therewith;

FIG. 18 is an enlarged view of the valve orifice which is provided to maintain zero pressure within the vacuum chambered portion of each belt structure while maintaining negative pressure of about −7 to −15 inches of mercury in the header;

FIG. 19 shows a partial plan view of a pin controlled memory unit which is used in delivering a signal from the reader to the check deflecting members of the stacking station to which the check in to be directed;

FIG. 20 is a front elevational view of FIG. 19, showing two pin controlled members; and FIG. 21 is a fragmentary elevational view showing means for effecting a pin restoring operation.

Figure 1:
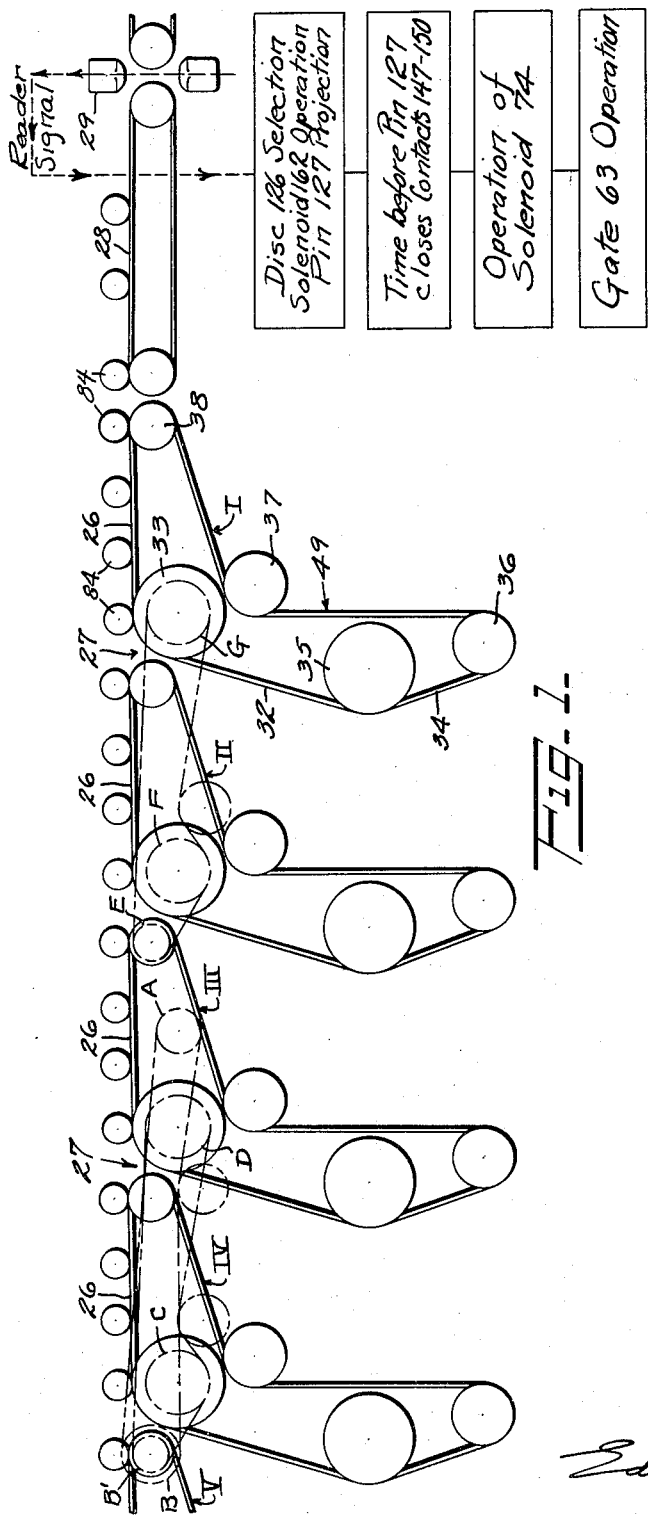
FIG. 1 is a diagrammatic plan view showing the general arrangement for advancing checks from a reader position through a multiple number of spaced loop belt structures and including drive means therefor.

Referring to the drawings in detail and more particularly FIG. 1, the system of check feeding shows several loop belt structures or units designated generally by Roman numerals I, II, III, IV and V, there being twelve in the present system. More or less units may be provided, as required. Each loop belt structure includes one reach 26 the total number of which follow a normally continuous path with each loop structure spaced apart as indicated at 27 and with the leading belt structure I arranged to receive a check from a belt feed 28 after passing a reading head 29. Each loop belt structure has a second reach 32 which results after passing over a pulley 33, and a third reach 34 which results after passing over a pulley 35. The belt continues over an end pulley 36, an idler pulley 37 and a lead pulley 38.

A drive for the loop belt structures may be provided in any suitable manner. For example, as shown in FIG. 1 in dot and dash lines, the drive of the belt structures shown commences with a motor driven pulley A from which a belt drives a pulley B to effect the drive of check feed belt V. From a pulley B' a belt drives a pulley C to effect the drive of check feed belt IV and continues to pulley D to effect the drive of another check feed belt III. Check feed belt II receives its drive through a belt from a pulley E to pulley F which belt continues to a pulley G to drive the check feed belt I.

Referring now to FIGS. 5 and 6, two vertically spaced and horizontally disposed toothed pulleys 33 are supported on a shaft 46, which shaft is mounted in bearing 47 carried by a base plate 48 which is supported by the machine frame. In a like manner each of the pulleys 35, 36 and 38, shown in FIG. 1, are toothed pulleys and are provided in vertically spaced and horizontally disposed pairs to support two toothed timing belts 49 thus providing two belt surfaces for engagement with each check during the advancement thereof. Two vertically spaced and horizontally disposed pulleys are also provided at 37 but these pulleys are engaged by the outer non-toothed surface of the belt and therefore have no teeth. All of said pulleys are carried by suitable shafts which are supported in bearings on the base plate 48.

To assure friction free movement of the check throughout its advance from the reading position to a final stacking position, a smooth surface or plate 50 is provided on the base plate 48.

A gating or check deflecting structure is provided at the spacing 27 between each pair of loop belt structures and comprises three deflecting fingers 51, one above, one between and one below the pulleys 33—33 and are carried by a shaft 52, supported in a bracket 53 secured to the base plate 48. Said shaft 52 extends downwardly through a bearing 54 and has a lever 55 mounted thereon, which lever is connected with a rocker member 56 at 56a by means of a link 57. The rocker member 56 is also secured to the lower end of a shaft 58 in an offset relation to 56a, as best shown in FIG. 8. Said shaft 58 extends upwardly through a bearing 59 and has a gating or deflecting element 63 secured thereto.

Also secured to the shaft 52 is a latch lever 64 which has a notched end 65 and is adapted to be latched to an end portion 66 of a trip lever 67. The trip lever 67 is mounted on a stud shaft 68 extending from a bracket 69, which bracket is supported by the base plate 48. Said trip lever 67 also includes a tail portion 72 which is connected with an armature 73 of a solenoid 74, the latter being supported by the bracket 69.

When said solenoid 74 is energized, the trip lever 67 is rocked about its shaft 68 to break the latch at 66, 65 and thus permit the lever 64 to be rocked to the position best shown in FIG. 7, by the action of a spring 75 stretched between an anchor pin 76 and said lever 64. In rocking to said latter position, the shaft 52 is rotated in a counter clockwise direction, as viewed from FIG. 7, until a roller 77 on a lever 78 engages with the peripheral surface of a cam 79 affixed to the lower end of shaft 46. The lever 78 is also fixed to the shaft 52 at the bottom thereof. The rotating of the shaft 52 will effect rocking of the lever 55 and endwise movement of the link 57 to thereby rotate the shaft 58 counter clockwise and consequently rock the gating or deflecting element 63 to the deflecting position of FIG. 7. The cam 79 has an eccentric periphery and during the unlatching operation of lever 64 the low side of the cam periphery is opposite the roller 77 which thus permits the operation of the deflecting mechanism to a check deflecting position. The said cam surface is so designed that after the check K is deflected in the manner shown in FIG. 10, and while the said check K is still moving through the deflecting elements 51 and 63, the latch lever will be restored to its normal position as indicated in FIG. 8, while the trailing end of the check K continues to advance in the position shown in FIG. 11. A spring 83 stretched between the anchor pin 76 and lever 67 will restore lever 67 to its latched position, as indicated in FIG. 8.

The checks K are normally maintained in frictional engagement with the belt surface of the first reach 26 of each of the belt loops by means of idler rollers 84 carried by supporting brackets 85, FIG. 2.

After the check K is deflected by a deflecting element 63 to move along the second reach of the belt, an idler roller 86 engages the outer surface of the check to maintain same in frictional engagement with the belt surface. Said roller 86 is mounted in a supporting bracket 87.

Each of the loop belts contains groups of holes 88 as best shown in FIGS. 4 and 12, which groups are evenly spaced apart throughout the length of each of the belts. Associated with the holes 88 in said belts are vacuum chambered elements 89, one for each belt, best shown in FIGS. 15 and 17. Said vacuum chambered elements comprise blades 92, each having an elongated slot 93 therein and mounted so that the slot 93 lies in the path of the holes 88 in the belt. See FIG. 17. Each blade 92 is suitably supported by means of a bracket 94 extending upwardly from the base plate 48. Each blade 92 is further connected with a valve unit 95 which comprises a cylinder 96, the interior of which is connected with the slotted portions 93 of the blades by means of openings 97. At the lower end of the cylinder 96, a valve element having a restricted orifice is provided which comprises a plug 98 having a threaded end screwed into a fitting 99 which is brazed to the said cylinder 96. The orifice comprises a restricted bleed opening 102 at the lower portion thereof and a conical opening 103 extending upwardly therefrom to the top of said plug 98.

The upper end of the cylinder 96 is provided with a threaded cap 104 and a fine mesh screen 105 is provided on the surface of the orifice plug 98. Between the cap 104 and screen 105 a suitable air filter of fibrous material is provided. The lower end of the fitting 99 is connected to a header 106 through a coupling 107, said header having several outlets connecting with several of the valve elements 95. A connection 108 is provided to a pump in the usual manner to maintain a negative pressure of preferably from −10 to −15 within the header 106. By means of the restricted orifice bleed opening 102 in the valve element 95, the pressure at the elongated slots 93 in the blades 92 is zero when no check is present in a hole covering position along the belt surface opposite the slotted area. Whenever a check K is present so as to block the holes 88, the vacuum or negative pressure developed preferably reaches −5 to −7 inches of mercury, which has been found sufficient to hold the check against the belt surface.

By accurate timing, the check movement is controlled so that it enters the second reach of any of the belt structures when deflected thereto at the time when a group of holes in each belt is a short distance back of the leading edge of the advancing check. This permits the check to be drawn forward by a force applied to the forward end thereof and thus causes the leading end of the check to be moved between the bite of the belt surface and stacked checks where the belt wraps around the pulley 35 and moves in the direction of the third reach of the belt at 34.

The checks K will vary in length, the longer checks actually covering two sets of holes in the belts as indicated in FIG. 12, where the second or trailing group of holes 88 are shown as approaching the vacuum slot 93 with the forward group of holes moving out of the slotted area. In order to prevent the trailing end of the longer checks from continuing the check advance while attracted to the belt whether by suction or otherwise, means is provided for forcibly removing the said trailing end of the check from the belt surface while the leading end of the check is approaching a stacking position.

As best shown in FIGS. 3 and 12, the latter means generally comprises a series of levers and links generally indicated at 111, which include a lever 112 having one end pivotally mounted at a fixed point 113 and having its free end connected at 114 with one end of a lever 115. The opposite end of the lever 115 is affixed at 120 to a plate 116 secured within a central recess 117 of the upper pulley 35. See FIGS. 3 and 4. Said connection 120 is off center from the center of the pulley 35 and thus effects a crank motion about the pulley center as the pulley rotates. The motion also provides a toggle action whereby the point of connection 114 of the two levers 112 and 115 will be rocked outwardly as indicated from the position of FIG. 3 to that of FIGS. 12 and 13. This motion will cause the lever 112 and the free ends of two coinciding levers 112a, 112a, spaced therebelow, to engage the surface of the check and force the trailing end of the check away from the surface of the belt. Levers 112a, 112a are best seen in FIG. 4.

Inasmuch as the checks vary in length, means is provided for producing the same action above described on short length checks which would not normally be forced away from the belt by the mechanism above described.

To accomplish the latter, a lever 118 is pivotally mounted on a shaft 119 and has its opposite end linked to the lever 115 by means of a link 122. The shaft 119 is supported by the base plate 48. Therefore, when the lever 115 moves outwardly the link 122 will force the free end of lever 118 outwardly, as shown in FIG. 14, to move the trailing end of the short check away from the surface of the belt. A lever 118a fixed to the lower end of the shaft 119 coincides with lever 118 and engages the lower portion of the check.

In each of the two instances above described wherein the trailing end of the check is forced away from the belt, the same occurs in time to remove the said trailing end portion of the check away from the path of a second check which would be approaching if two checks were deflected in sequence to the same stacking position. If removal of the trailing end of the check had not been provided for, it would have been possible for such end to hang up on the surface of the belt while in its final stacking position thus causing a jam to occur with the leading end of the following check as the second check moved toward the final stacking position.

The stacking station comprises a tray 124 positioned perpendicular to the third reach of the belt loop at 34 and further includes a back stop 125 which moves rearward as each check enters between said back stop or another check and the peripheral surface of the belt portion where the belt engages the pulley 35.

Any suitable memory device may be provided to receive a signal from the reading head and deliver said signal to the gating unit which is to receive the check. One form disclosed herein utilizes the pin memory type of structure with an improved method of delivering the signal to the latch releasing solenoid 74 previously described.

Said memory unit comprises a multiple number of vertically spaced discs 126, each representing one of the gating stations with the exception of the first and last which require no memory devices. Each disc 126 includes a required number of pins 127 circumferentially spaced therearound, which pins are freely positioned within holes 131 and are adapted to be retained in either a raised or depressed position by means of spring pressed detent balls 128 which cooperate with circumferential grooves 129 in said pins. The discs are mounted on a shaft 130 driven in a timed relation to the timing belts 49. Pin depressing elements generally indicated at 133 are each pivotally mounted upon a shaft 134 and each is adapted to rock in the path of an approaching pin 127 when released through the action of a latch releasing mechanism generally indicated at 135. Each pin depressing element comprises a lever 136 having a wing 137 extending toward but normally out of the patch of one of the pins 127. A stop screw 138 in the lever 136 has a head portion normally urged into contact with an abutment end 139a of a lever 139 by means of a spring 155. Said lever 139 is pivoted at 156 and has a block 157 secured thereto which extends toward but normally out of the path of another one of the pins 127. The pin depressing lever 136 has a lug extension 158 which normally engages a notch 159 of a pivotal latch member 160, which member is maintained in a latching position by means of a spring 161. A solenoid 162 has its armature connected with the latch member 160 to effect release thereof from the lug 158 when a signal, received from the reader 29, energizes said solenoid. When said latch release occurs, the lever 136 will be urged in a counter-clockwise direction to cause the wing 137 to move into the path of a pin 127 and further cause the pin 127 to be depressed as a result of the camming action of the angular surface of said wing as indicated at 163, FIG. 21.

Return of the lever 136 to its latched position is effected when the depressed pin engages the edge of block 157 which moved into the patch thereof during the unlatching operation of the lever 136.

Return of the depressed pin is effected when said pin engages a cam element 152 in the patch thereof as seen in FIG. 21.

When a pin 127 is depressed, it will move with the disc 126 circumferentially through a predetermined arc and eventually engage with a signal actuating device generally indicated at 140. Said actuating device comprises a wheel 141 having radially projecting fingers 142 and mounted to rotate on a stud 143. One of said fingers 142 lies in the path of the approaching depressed pin 127 and is eventually engaged to effect partial rotation of the wheel 141. A notched disc 144, carried by said stud 143, rotates with the wheel 141 the distance that the wheel 141 is rotated by the pin. A circuit make and break element, similar to that found in a distributor of an automobile, is provided which comprises an arm 145 pivoted at 146 and having a contact 147 at the end thereof. Said arm 145 also has a projection 148 which normally rests against the peripheral surface of the disc 144. As the disc is rotated, the projection 148 drops off a shoulder 149a and engages a notch 149 in the peripheral surfaces of the disc thus causing the lever 145 to rock the contact end 147 into contact with a fixed contact point 150. Said contact engagement is immediately broken, however, when the projection 148 is cammed outwardly by a cam portion 151 of the notch 149. Hence during the motion of the finger 142, as a result of the engagement of a pin 127 therewith, the contacts 147 and 150 effect a make and break. The number of notched portions 149 equals the number of fingers 142.

After the pin 127 has performed the above operation it is returned to its normal position by means of the cam surface of a cam element 152.

While the structure described is particularly adapted for check feeding and stacking, it is to be understood that any other sheet-like documents or workpieces may be substituted.

What is claimed is:

1. In a machine for sorting and stacking checks and like documents in accordance with data appearing thereon, data reading means, means for transporting said checks on edge through a data reading position, several identical traveling belt elements for transporting said checks along a substantially straight path after passing the reading means, each belt element comprising a continuously running closed loop having openings therein and including one reach forming a part of the straight path of feed and a second reach directed away from said path, the first named reach of each belt loop being spaced one from another, means coacting with the first named reach of each belt to assist check feed, means in the check path at the spaced locations operable to divert predetermined checks from the first to the second named reach of a continuously running belt loop, vacuum means cooperating with the second named reach of each belt loop and with the openings therein to draw the check to the belt and cause the check to be advanced thereby, a check receiving element in the path of the leading end of the vacuum advanced check, and continuously reciprocating means engageable with the trailing end of the check to remove said end from the path of a succeeding check when successive checks are advanced thereto.

2. In a machine for sorting and stacking checks and like documents in accordance with data appearing thereon, data reading means, means for transporting said checks on edge past the data reading means along a substantially straight path, several stacking stations along said path, each stacking station including continuously running vertically spaced closed loop toothed timing belts having one reach forming part of the straight path of feed and a second reach away from said path, the first named reach of each of said belts being horizontally spaced from one another, idler roller elements cooperating with the first named reach of each belt loop, deflecting elements in the check path at the spaced locations and selectively operable as the check passes the data reading means to deflect the check away from the first to the second named reach of a continuously running belt as determined by the data read, means to return the operated deflecting element to a non-deflecting position before the trailing end of a deflected check has completely passed thereby, vacuum means cooperating with part of the second named reach of each belt including openings in the belt cooperating therewith to draw the check to the belt and cause the leading end of the check to be carried to a superimposed stacking position along a plane differing from the plane of the second reach of belt, and means for deflecting the trailing end of the check out of the plane of the second reach of the belt to clear the way for a second check to be conveyed to the stacking station when consecutive checks are deflected to the same stacking station.

3. In a device for advancing and stacking checks and like documents at several selective stacking positions, means to advance checks along one edge thereof including several identical closed loop traveling conveyor belts having spaced groups of openings therein and having one surface frictionally engaging one surface of the checks while advancing same along one reach of each loop in one continuous direction, means to divert predetermined checks from the latter direction along a second reach of a selected belt loop while continuing the frictional feed thereof, vacuum means associated with said second reach of belt and cooperating with the openings in the belt to advance the diverted checks toward a final stacking position, a third reach of belt directed along a path differing from the path of the second reach thereof, check stacking means operable to receive and direct each check along said third reach of belt, and means movable against the back surface of the check to force the trailing end of the check away from the belt surface of the second reach of belt while the check moves into the stacking means thereby preventing obstruction by the first named check to a second check which follows the first check in sequence.

4. In a device for advancing and stacking checks and like documents at a multiple number of selective stacking positions, means to advance checks along one edge thereof including a plurality of closed loop traveling conveyor belts having spaced groups of openings therein and having one surface frictionally engaging one surface of the checks while advancing same along one reach of each loop in one continuous direction, means to divert predetermined checks from the latter direction along a second reach of a selected belt loop while continuing the frictional feed thereof, vacuum means associated with said second reach of belt and cooperating with the openings in the belt to advance the diverted checks toward a final stacking position, a third reach of belt to direct the checks away from the path of the second reach thereof, a pulley around which the second reach of belt travels to the direction of the third reach, a crank associated with the pulley structure including two levers joined to form a toggle with one free end of one lever pivoted at a fixed point and with the free end of the other lever attached to the crank, the levers being moved against the back surface of the check to force the trailing end of the check away from the belt surface thereby preventing obstruction by the first named check to a second check which follows the first check in sequence.

References Cited in the file of this patent

UNITED STATES PATENTS

| | | |
|---|---|---|
| 1,829,984 | Ehlig | Nov. 3, 1931 |
| 2,023,531 | Kleinschmidt et al. | Dec. 10, 1935 |
| 2,229,638 | Chamberlin | Jan. 28, 1941 |
| 2,427,223 | Moore | Sept. 9, 1947 |
| 2,617,528 | Moore | Nov. 11, 1952 |
| 2,752,154 | Nelson | June 26, 1956 |
| 2,795,328 | Tyler et al. | June 11, 1957 |
| 2,822,170 | Frantz | Feb. 4, 1958 |
| 2,867,438 | Hori | Jan. 6, 1959 |